Figure 1:
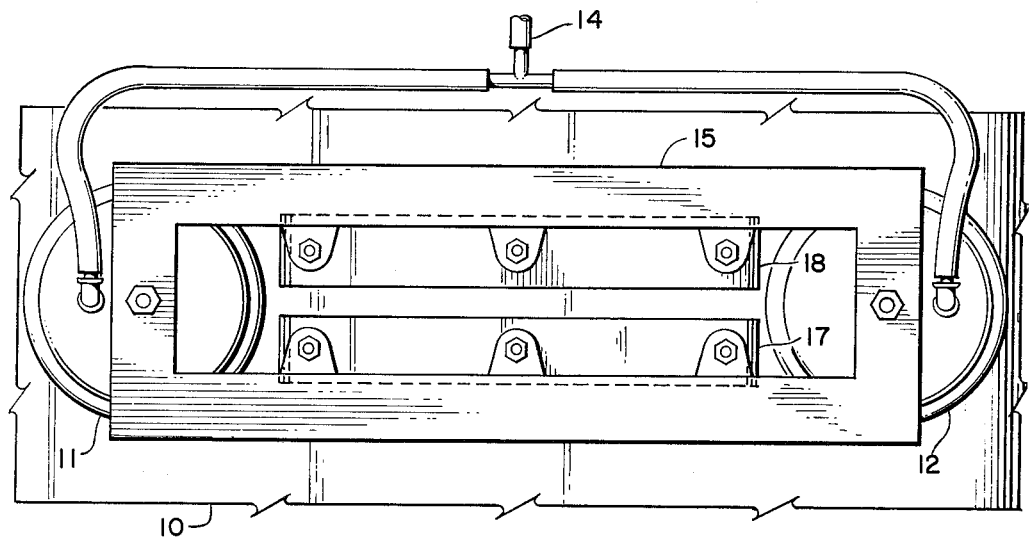

Sept. 21, 1965 F. R. CLOVER, JR., ETAL 3,207,503
HOLDING OR CLAMPING APPARATUS
Filed July 3, 1962

INVENTOR.
FRANKLIN R. CLOVER, JR.
M. CLYDE GOTT
BY

*Earl C. Hancock*

AGENT

United States Patent Office 3,207,503
Patented Sept. 21, 1965

3,207,503
HOLDING OR CLAMPING APPARATUS
Franklin R. Clover, Jr., Denver County, and Montroy Clyde Gott, Arapahoe County, Colo., assignors to Martin-Marietta Corporation, Baltimore, Md., a corporation of Maryland
Filed July 3, 1962, Ser. No. 207,342
5 Claims. (Cl. 269—21)

This invention relates to quickly detachable holding or clamping devices. More particularly, this invention relates to devices either capable of holding parts in position on a surface or capable of providing temporary structural reinforcement or heat dissipation for a surface to be worked upon. The present invention is particularly useful as an aid for welding operations in positions that are remote from the edges of large and/or irregularly shaped metal parts but is in no way limited to this use.

It is frequently necessary to weld a component or to perform a weld operation on a large sheet of metal at a point remote from the edge of the sheet. For instance, this problem is encountered in attaching clips, cups, heat radiating fins or the like along the surface of a large dome or tank or in repair welding in the middle of a large sheet of metal where the use of C-clamps or other known devices is impossible or impractical. In the past, the components to be welded were held in place manually, by tape or by tack welding but the hazards and/or limitations of such methods are manifold. In addition, it was necessary to manually hold or tape water bags, wet rags or back-up bars in place around or behind the weld area in an effort to prevent warping, canning (the dimpling of a surface area at a location slightly removed from the weld), warping or cracking of the base metal or improper weld beads. However, the reliable control of conditions and the support of the base metal are two important requirements for this type of operation which could not be properly realized by the previously known techniques and devices.

Accordingly, the present invention is a relatively portable apparatus that can be used to clamp components in place or to provide a support or heat dissipating back-up any place on a large sheet of material regardless of the distance of the location from the edges. More specifically, the apparatus of this invention uses a cross bar with at least two suction cup devices mounted thereon and means attached to this bar between the suction cups for providing pressure between the bar and the surface to which the device is to be attached. The strength of attachment of the device can be materially increased by using vacuum actuated suction cups. Further, the device can be constructed so as to accommodate curved or irregular surfaces by making the various attachments to the cross bar adjustable and by ball and socket attachments for the suction cups and/or the pressure producing means.

The means for producing pressure between the bar and the surface can take any of several forms. For instance, it can be designed to hold components of a specific design in a particular location on a surface. In addition, the pressure producing means can be made up in the form of a plate comprising a series of laminated layers with the uppermost of these layers being pivotably and extensibly attached to the cross bar so that the plate can be made to conform to the surface through the exertion of pressure thereon by the cross bar.

Thus the present invention provides a positive clamping or back-up function that can be easily adapted to curved or irregular surfaces. Surfaces can be supported and held in alignment with relatively even and more predictable heat dissipation capabilities than has been known heretofore.

Figure 2:
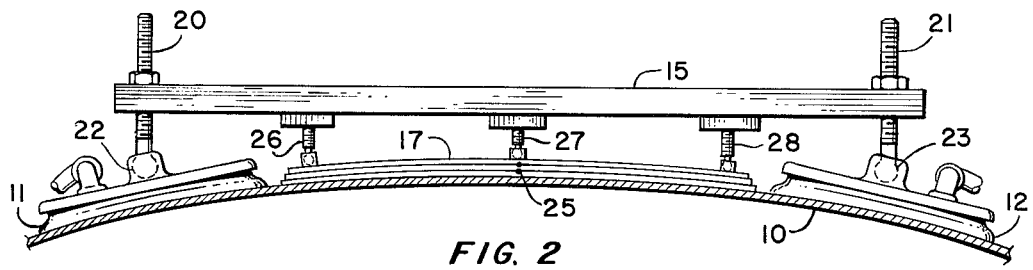

The novel features considered characteristic of this invention are set forth with particularity in the appended claims. The invention, however, both as to its organization and preferred modes of operation as well as additional features and advantages thereof will be best understood from the following description when read in connection with the accompanying drawings in which:

FIGURE 1 is a top view of one embodiment of this invention that is particularly useful for seam welding, and FIGURE 2 is a side view of the embodiment shown in FIGURE 1 wherein the adaptability of this invention to curved surfaces is more clearly illustrated.

It should be noted that like reference numerals are used herein for both FIGURE 1 and FIGURE 2 wherever applicable.

FIGURE 1 reveals one embodiment of this invention that is attached to the surface of a large sheet of material 10 which is here shown as a relatively small, broken out piece for simplicity purposes. The apparatus is attached to material 10 by means of suction cup devices 11 and 12 which could be of the usual variety of suction cup. However, it has been found to be more desirable to actuate these suction cups by vacuum producing means (not shown) which in FIGURE 1 would be coupled to cups 11 and 12 by tube 14.

A cross bar 15 is attached to cups 11 and 12 and in turn has plates 17 and 18 attached thereto. Plates 17 and 18 are forced downward against surface 10 whenever cups 11 and 12 are actuated or by adjusting set screw arrangements after actuation of the suction cups. A space between plates 17 and 18 can be seen in FIGURE 1 and in this space a seam weld operation could be performed with heat dissipation and/or surface alignment being accomplished through plates 17 and 18. The welding rod would preferably be inserted through the opening or channel in cross bar 15, of course.

FIGURE 2 which is a side view of the embodiment shown in FIGURE 1, more clearly reveals the arrangement for adapting this invention to a curved sheet of material 10. In FIGURE 2, it can be seen that cups 11 and 12 are attached to mounting rods 20 and 21 by ball and socket arrangements 22 and 23. In addition, mounting rods 20 and 21 are held against cross bar 15 by bolts although it should be appreciated that rods 20 and 21 could be threadedly engaged through bar 15. Thus by extending or retracting rods 20 and 21 and by the swivel action of ball and socket arrangements 22 and 23, a wide variety of curvatures or irregularities of the surface of sheet 10 can be accommodated.

Another feature shown in FIGURE 2 is the arrangement whereby back-up or hold down plate 17 can be adapted to the surface of sheet 10. In particular, plate 17 is shown as being made up of three laminated layers although there is nothing critical about the number of layers used of course. The laminated layers shown are attached at point 25 which can be done by any desirable means such as a weld bead. Thus the layers are allowed to slip over one another at all points except at 25 thereby providing a contour matching capability. To maintain pressure across plate 17, the uppermost laminated layer thereof is attached by ball and socket joints to three mounting rods 26, 27 and 28. Rods 26–28 are then extensibly attached to cross bar 15 so that the amount of pressure and/or contour conformation of plate 17 can be closely controlled. It should be appreciated that the same effect can be realized by a simple force contact between swivel set screws for rods 26–28 and the uppermost laminated layer without any ball and socket or other attachment therebetween.

If seam welding is to be performed between plates 17 and 18, it would frequently be advisable to place a heat dissipating back-up bar on the other side of sheet 10. In that case, a device substantially the same as that shown in FIGURES 1 and 2 could be utilized with a solid cross bar instead of channeled cross bar 15. Further, only mounting rod 27 would be necessary for holding plate 17 in position since a concave surface would then be involved. It would be advisable to provide a groove across the bottom of the plate, however, to accommodate the weld bead.

There are many variations of structure and utility within the spirit of this invention. The plates 17 and 18 could be used to hold a component in position for a temporary arrangement or for welding purposes. Further, a single solid bar could be used in place of cross bar 15 and a single plate or a large number of plates could be used in place of plates 17 and 18. The single pair of suction cup devices 11 and 12 could be replaced with an array of similar devices or other similar attachment devices, such as magnets could be used. For flat surfaces in particular, a single rigid mounting means could be used along with solid plates for the pressure producing means (i.e., in place of rods 26–28 and plates 17 and 18). Of course, cross bar 15 could be made in any desired configuration or could be made flexible to increase the adaptability of the device.

It should also be here noted that a series of laminated layers for plates such as 17 comprising a plurality of copper layers sandwiched between a pair of steel layers has been found to be an excellent arrangement for a heat dissipating flexible plate. In that particular arrangement, the layers were held together by grooving the edges transversely to the flat surfaces of the layers and silver soldering a steel dowell rod in the groove.

Many other variations within the spirit of this invention will be readily apparent to those having normal skill in the art.

What we claim is:

1. An apparatus for use on a surface comprising an elongated cross bar having a substantially flat configuration, a plurality of vacuum actuated suction cup devices, a plurality of first mounting rods, one end of each of said first mounting rods being attached to a respective one of said suction cup devices by a ball and socket arrangement, said first mounting rods being mounted in spatial relation on said bar for allowing selectable movement of said suction cup devices with respect to a plane generally normal to one of the faces of said bar, a plate comprising a plurality of flexible and substantially flat laminated layers rigidly attached to one another at at least one point for allowing said layers to slip over one another at all places except at the point of attachment of said layers, and at least one second mounting rod constructed and arranged for forcing said laminated layers towards the surface whenever said suction cup devices are attached to the surface, said second mounting rod being attached to said one side of said bar for allowing selectable movement of said plate in a plane generally normal to said one side of said bar.

2. An apparatus in accordance with claim 1 wherein said second mounting rod is attached to an outermost one of said laminated layers by a ball and socket arrangement.

3. A hold-down or back-up apparatus for use on a surface comprising a generally flat bar having a channel therethrough extending in a direction generally perpendicular to the flat surfaces thereof, a pair of first mounting rods extensibly attached on one of the flat surfaces of said bar and disposed so that said channel is therebetween, a pair of securing means attached to respective ones of said first mounting rods, at least two plates, and at least one pair of extensible attaching means each retaining a respective one of said plates to said one of the flat surfaces of said bar, each of said plates being disposed substantially between said securing means and on opposite sides of said channel from one another.

4. An apparatus in accordance with claim 3 wherein said plates are each made up of a plurality of laminated layers rigidly attached to one another at one point so that said layers will be allowed to slip with respect to one another at all places except the point of attachment.

5. An apparatus for use on a surface, comprising an elongated bar; a plurality of mounting means attached in spatial relation on said bar; securing means for attaching said apparatus to said surface and connected to said mounting means; at least one plate having a plurality of layers rigidly attached to each other at one point for allowing said layers to slip over one another so that said plate can conform to curved and irregular surfaces; and means adjustably attaching said plate to said bar for forcing said plate toward said surface between at least two said attaching means, whereby said plate can provide pressure between said bar and said surface whenever said securing means are attached to said surface.

References Cited by the Examiner

UNITED STATES PATENTS

| | | | |
|---|---|---|---|
| 1,962,350 | 6/34 | Kane | 113—111 |
| 2,311,525 | 2/43 | Ebbs | 113—99 |
| 2,314,788 | 3/43 | Innes | 113—99 |
| 2,321,308 | 6/43 | Miller | 113—111 |
| 2,366,935 | 1/45 | Schmid. | |
| 2,855,653 | 10/58 | Kastenbein. | |
| 3,024,521 | 3/62 | Polk | 113—99 XR |

FOREIGN PATENTS 689,545   4/53   Great Britain.

CHARLES W. LANHAM, *Primary Examiner.*

JOHN F. CAMPBELL, *Examiner.*